US010970177B2

(12) United States Patent
Bulkowski et al.

(10) Patent No.: US 10,970,177 B2
(45) Date of Patent: Apr. 6, 2021

(54) METHODS AND SYSTEMS OF MANAGING CONSISTENCY AND AVAILABILITY TRADEOFFS IN A REAL-TIME OPERATIONAL DBMS

(71) Applicants: Brian J. Bulkowski, Menlo Park, CA (US); Venkatachary Srinivasan, Sunnyvale, CA (US); Andrew Gooding, Mountain View, CA (US)

(72) Inventors: Brian J. Bulkowski, Menlo Park, CA (US); Venkatachary Srinivasan, Sunnyvale, CA (US); Andrew Gooding, Mountain View, CA (US)

(*) Notice: Subject to any disclaimer, the term of this patent is extended or adjusted under 35 U.S.C. 154(b) by 187 days.

(21) Appl. No.: 16/104,939

(22) Filed: Aug. 19, 2018

(65) Prior Publication Data

US 2019/0251006 A1     Aug. 15, 2019

Related U.S. Application Data

(60) Provisional application No. 62/547,678, filed on Aug. 18, 2017.

(51) Int. Cl.
*G06F 11/00* (2006.01)
*G06F 11/14* (2006.01)
(Continued)

(52) U.S. Cl.
CPC ...... *G06F 11/1492* (2013.01); *G06F 11/1425* (2013.01); *G06F 11/2023* (2013.01);
(Continued)

(58) Field of Classification Search
CPC .... G06F 16/27; G06F 16/273; G06F 16/2428; G06F 16/278; G06F 16/2365;
(Continued)

(56) References Cited

U.S. PATENT DOCUMENTS

| 5,539,883 A | * | 7/1996 | Allon | G06F 9/5088 |
| | | | | 370/237 |
| 6,018,810 A | * | 1/2000 | Olarig | G06F 11/2007 |
| | | | | 710/307 |

(Continued)

OTHER PUBLICATIONS

Kleppmann, "Please stop calling databases CP or AP", May 2015, Martin Kleppmann's blog, pp. 1-11 (Year: 2015).*

(Continued)

*Primary Examiner* — Bryce P Bonzo
*Assistant Examiner* — Jeison C Arcos

(57) ABSTRACT

In one aspect, a computerized method for managing consistency and availability tradeoffs in a real-time operational database management system (DBMS) includes the step of implementing consistency in an AP mode of the real-time operational DBMS by implementing the following steps. The method adds a set of schemes that enable a real-time operational DBMS to linearize read/write operations in all situations except a first specified situation and a second specified situation. The real-time operational DBMS is in AP mode, at least one master node for every data item is available in the database cluster of the real-time operational DBMS at all times. The method implements a CP mode of operation.

14 Claims, 5 Drawing Sheets

(51) Int. Cl.
  *G06F 11/20*   (2006.01)
  *G06F 16/23*   (2019.01)
  *G06F 16/27*   (2019.01)
(52) U.S. Cl.
  CPC ...... *G06F 16/2308* (2019.01); *G06F 16/2365* (2019.01); *G06F 16/27* (2019.01)
(58) Field of Classification Search
  CPC ............. G06F 2201/80; G06F 2201/82; G06F 11/1474; G06F 11/1492; G06F 11/2023; G06F 11/2094
  See application file for complete search history.

(56) References Cited

U.S. PATENT DOCUMENTS

| | | | | |
|---|---|---|---|---|
| 6,449,700 | B2* | 9/2002 | Hagersten | G06F 11/0712 711/152 |
| 7,478,263 | B1* | 1/2009 | Kownacki | G06F 11/2028 714/10 |
| 7,730,489 | B1* | 6/2010 | Duvur | G06F 9/466 714/2 |
| 8,745,445 | B1* | 6/2014 | Choi | G06F 16/214 714/16 |
| 2001/0008019 | A1* | 7/2001 | Vert | G06F 11/1662 714/1 |
| 2002/0103663 | A1* | 8/2002 | Bankier | G06Q 20/02 709/224 |
| 2003/0159084 | A1* | 8/2003 | Murphy | G06F 11/203 714/13 |
| 2004/0098411 | A1* | 5/2004 | Highleyman | G06F 11/2097 |
| 2005/0125557 | A1* | 6/2005 | Vasudevan | G06F 11/2038 709/239 |
| 2009/0313311 | A1* | 12/2009 | Hoffmann | G06F 11/2097 |
| 2011/0289052 | A1* | 11/2011 | Rambacher | G06F 16/1873 707/624 |
| 2012/0203745 | A1* | 8/2012 | Myers | G06F 16/2255 707/691 |
| 2012/0331029 | A1* | 12/2012 | King, III | G06F 16/278 709/201 |
| 2013/0036106 | A1* | 2/2013 | Lucas | G06F 16/27 707/703 |
| 2013/0268495 | A1* | 10/2013 | Thiel | G06F 11/20 707/691 |
| 2014/0279837 | A1* | 9/2014 | Guo | G06F 16/282 707/603 |
| 2014/0365811 | A1* | 12/2014 | Veiga | G06F 11/1425 714/4.11 |

OTHER PUBLICATIONS

Diack, "CAP Theorem between Claims and Misunderstandings: What is to be Sacrificed?", Jul. 2013, International Journal of Advanced Science and Technology, pp. 1-12 (Year: 2013).*
Abadi, "Consistency Tradeoffs in Modern Distributed Database System Design" Feb. 2012, IEEE, pp. 37-42 (Year: 2012).*
Brandenburger, "Don't Trust the Cloud, Verify: Integrity and Consistency for Cloud Object Stores", Jul. 2017, ACM, pp. 1-30 (Year: 2017).*
Brewer, "CAP Twelve Years Later: How the "Rules" Have Changed", Feb. 2012, IEEE, pp. 23-29 (Year: 2012).*
Browne, "Brewer's CAP Theorem", Jan. 2009, www.julianbrowne.com/article/brewers-cap-theorem, pp. 1-11 (Year: 2009).*
Gilbert, "Brewer's Conjecture and the Feasibility of Consistent, Available, Partition-Tolerant Web Services", Aug. 2003, MIT, pp. 1-12 (Year: 2003).*
Code Hale, "You Can't Sacrifice Partition Tolerance", Oct. 2010, Code Hale, pp. 1-11 (Year: 2010).*
Liochon, "CAP, Availability, High-Availability and Big Data databases in a world of partitions", Apr. 2015, http://blog.thislongrun.com/2015/04/cap-availability-high-availability-and_16.html, pp. 1-8 (Year: 2015).*
Liochon, "The unclear CP vs. CA case in CAP", Apr. 2015, http://blog.thislongrun.com/2015/04/the-unclear-cp-vs-ca-case-in-cap.html, pp. 1-12 (Year: 2015).*

* cited by examiner

METHODS AND SYSTEMS OF MANAGING CONSISTENCY AND AVAILABILITY TRADEOFFS IN A REAL-TIME OPERATIONAL DBMS

CROSS-REFERENCE TO RELATED APPLICATIONS

This application claims priority to U.S. provisional patent application No. 62/547,678 filed on 18 Aug. 2017. This provisional patent application is hereby incorporated by reference in its entirety.

BACKGROUND

A real-time operational database management system (DBMS) can be used for handling real-time mission-critical applications in the area of real-time bidding, fraud detection for online payments, continuous risk management for stock accounts, revenue assurance.

In many of these use cases the real-time operational DBMS can support up to a few million reads/writes per second focusing on primary key operations over a diverse record set. Low read latency, high write load, and high uptime can be important in these use cases and consistency need not be guaranteed. Therefore, the real-time operational DBMS can be prioritized availability over consistency during network partitioning events (e.g., split-brain) and the system works in AP (available and partition tolerant) mode as per the CAP theorem. The CAP theorem postulates that only two of the three properties of consistency, availability, and partition tolerance can be guaranteed in a distributed system at a specific time.

The real-time operational DBMS can be used to replace systems of record that contain critical transactional data, especially when they are used in real-time applications. Such systems of record need to prioritize consistency over availability during network partitioning events (e.g. split-brain event) and the real-time operational DBMS can operate in CP (consistent and partition tolerant) mode as per the CAP theorem. One issue with the real-time Operational DBMS can be focused on determining how much availability can be retained while providing strict consistency (e.g., linearize all read/write operations to the database) with a per-row atomicity guarantee. Since the real-time operational DBMS may be extremely fast already, a goal can be to ensure that the performance and most of the availability can be preserved while adding consistency support that linearizes all operations to the database. As expected, this goal can pose various technical challenges. The processes and system provided herein can be used to ameliorate this issue.

BRIEF SUMMARY OF THE INVENTION

In one aspect, a computerized method for managing consistency and availability tradeoffs in a real-time operational database management system (DBMS) includes the step of implementing consistency in an AP mode of the real-time operational DBMS by implementing the following steps. The method adds a set of schemes that enable a real-time operational DBMS to linearize read/write operations in all situations except a first specified situation and a second specified situation. The real-time operational DBMS is in AP mode, at least one master node for every data item is available in the database cluster of the real-time operational DBMS at all times. The method implements a CP mode of operation.

Figure 1:
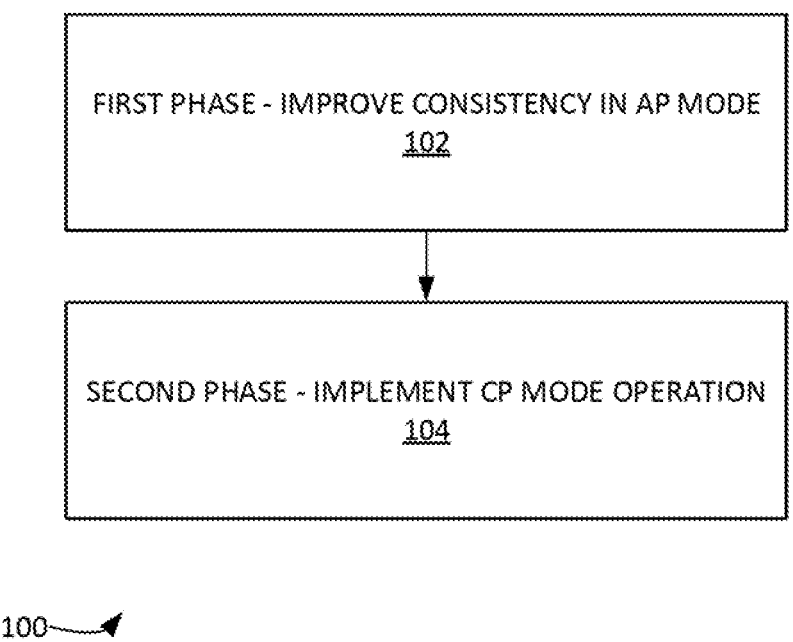
FIG. 1 illustrates an example process of managing consistency and availability tradeoffs in a real-time operational DBMS, according to some embodiments.

The Figures described above are a representative set, and are not an exhaustive with respect to embodying the invention.

DESCRIPTION

Disclosed are a system, method, and article of manufacture of managing consistency and availability tradeoffs in a real-time operational DBMS. the following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

AP mode can mean available but not consistent under network partitions of a distributed database system.

CP mode can mean consistent but not available under network partitions of a distributed database system.

CAP Theorem postulates that only two of the three properties of consistency, availability, and partition tolerance can be guaranteed in a distributed system at a specific time. Since availability is paramount in most deployments, the system can either provide consistency or partition tolerance. It is noted, however, that these three properties are more continuous rather than binary.

Dynamic random-access memory (DRAM) can be a type of random-access memory that stores each bit of data in a separate capacitor within an integrated circuit.

Solid-state drive (SSD) can be a data storage device using integrated circuit assemblies as memory to store data persistently.

Split-brain can indicate data and/or availability inconsistencies originating from the maintenance of two separate data sets with overlap in scope (e.g. because of servers in a network design; a failure condition based on servers not communicating and synchronizing their data to each other; etc.).

EXEMPLARY METHODS

An example mechanism for deleting records is now discussed.

FIG. 1 illustrates an example process 100 of managing consistency and availability tradeoffs in a real-time operational DBMS, according to some embodiments. Process 100 can ensure that the performance and most of the availability can be preserved while adding consistency support that linearizes all operations to the database. As expected, process 100 implements this in two phases/steps. In a second phase 104, process 100 can implement a CP mode of operation. Process 300 infra provides an example of aspects of implementing CP mode in a real-time operational DBMS.

Figure 2:
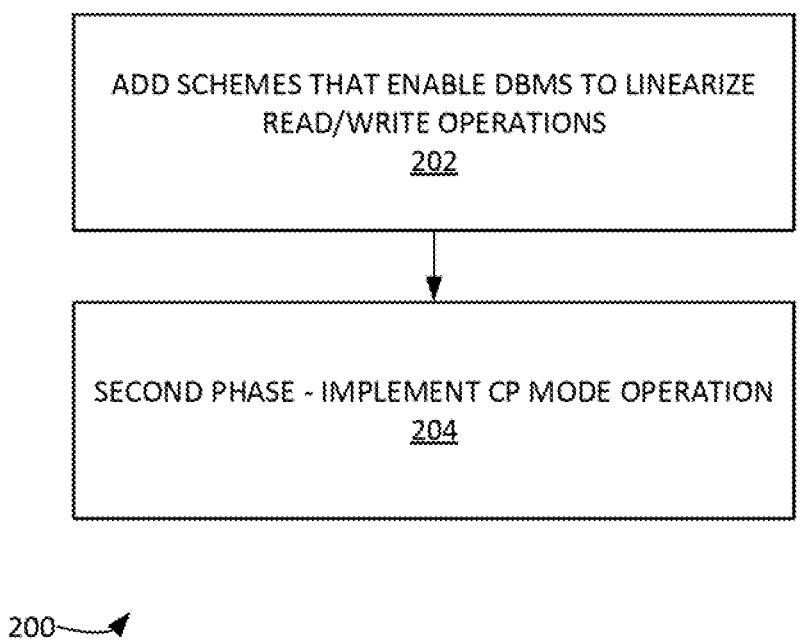
FIG. 2 illustrates an example process for improve improve consistency in an AP mode, according to some embodiments.

More specifically, in step 102, process 100 can improve consistency in an AP mode using process 200 of FIG. 2. Consistency in AP mode can be implemented by adding schemes that enable a real-time operational DBMS to linearize read/write operations in all except two situations. The first situation can be when a split-brain partition occurs on the cluster. The second situation can be when a number of nodes (e.g. more than the replication count) are simultaneously lost due to failures. It is noted that in AP mode, availability of the system is not compromised since at least one master for every data item is available in the database cluster (e.g. a set of nodes) at all times (e.g. even during network partitions). Process 200 can provide the maximum possible level of consistency in AP mode. For example, the system does not lose writes during rolling upgrades and other failure situations short of the two explicitly called out above.

FIG. 2 illustrates an example process for improve improve consistency in an AP mode, according to some embodiments. In step 202, process 200 can add schemes that enable DBMS to linearize read/write operations. In step 204, process 200 can implement cp mode operation.

Figure 3:
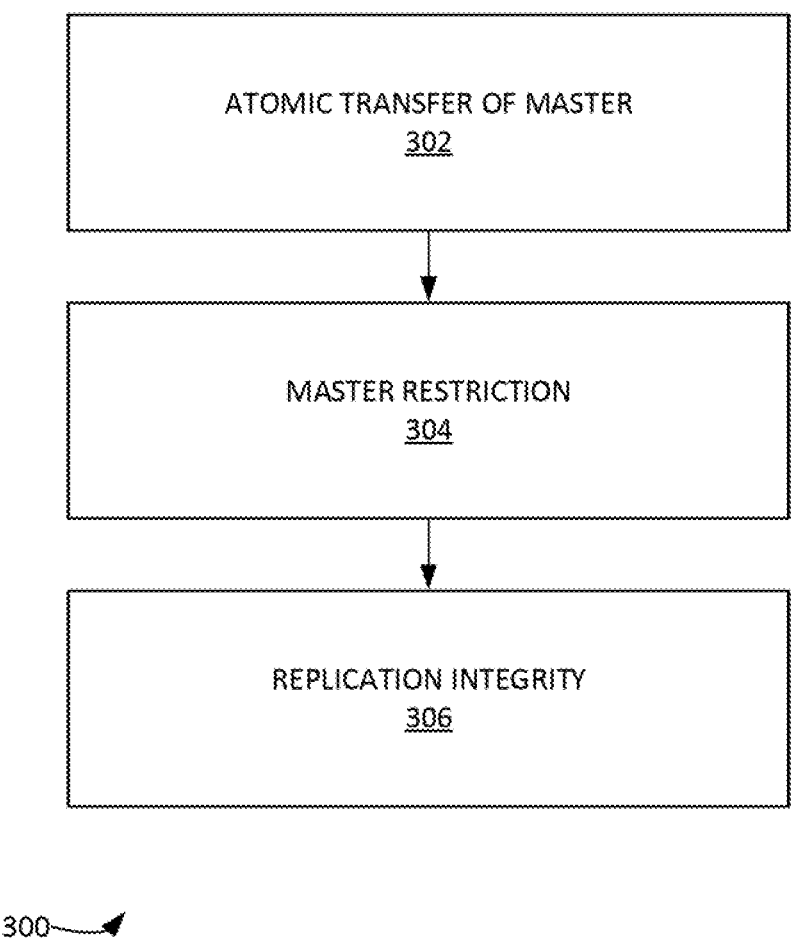
FIG. 3 illustrates an example process of implementing CP mode in a real-time operational DBMS, according to some embodiments.

FIG. 3 illustrates an example process 300 of implementing CP mode in a real-time operational DBMS, according to some embodiments. In step 302, process 300 can implement an atomic transfer of master node. For example, in a distributed database system, the issue of transfer of master from one node to another is important during various failure situations. Process 300 can ensure that there is, at most, one master node for a specific data item at all times.

In step 304, process 300 can implement master restriction. To ensure that no more than one master is ever available, information about the nodes participating in the database cluster can be maintained to allow a subset of nodes to determine with certainty whether it may master subsets of the data.

In step 306, process 300 can implement replication integrity. To guarantee strict consistency, process 300 maintains replication integrity, using a redo mechanism, to ensure that no reads/writes are allowed when replicas are in an unknown state.

It is noted that the atomic transfer of master, master restriction and replication integrity together guarantee that the read and write operations to the database are linearized. A trade-off may exist between complexity of the scheme and degree of availability. For example, the more available a system then the higher the complexity of implementation can be. Specifically, during two-way split-brain situations, process 300 can make the data available somewhere in the cluster, while preserving consistency. For split-brains this can result in more than one cluster. It is noted that, in some cases, availability can reduce in a graceful manner, as the number of split-brain components increases. Process 300 can add these consistency features without significant impact on the straight-line performance in the system. It is noted that the real-time operational DBMS can manage a flash-optimized in-memory NoSQL database and/or other database systems such as those provided infra.

Exemplary Computer Architecture and Systems

Figure 4:
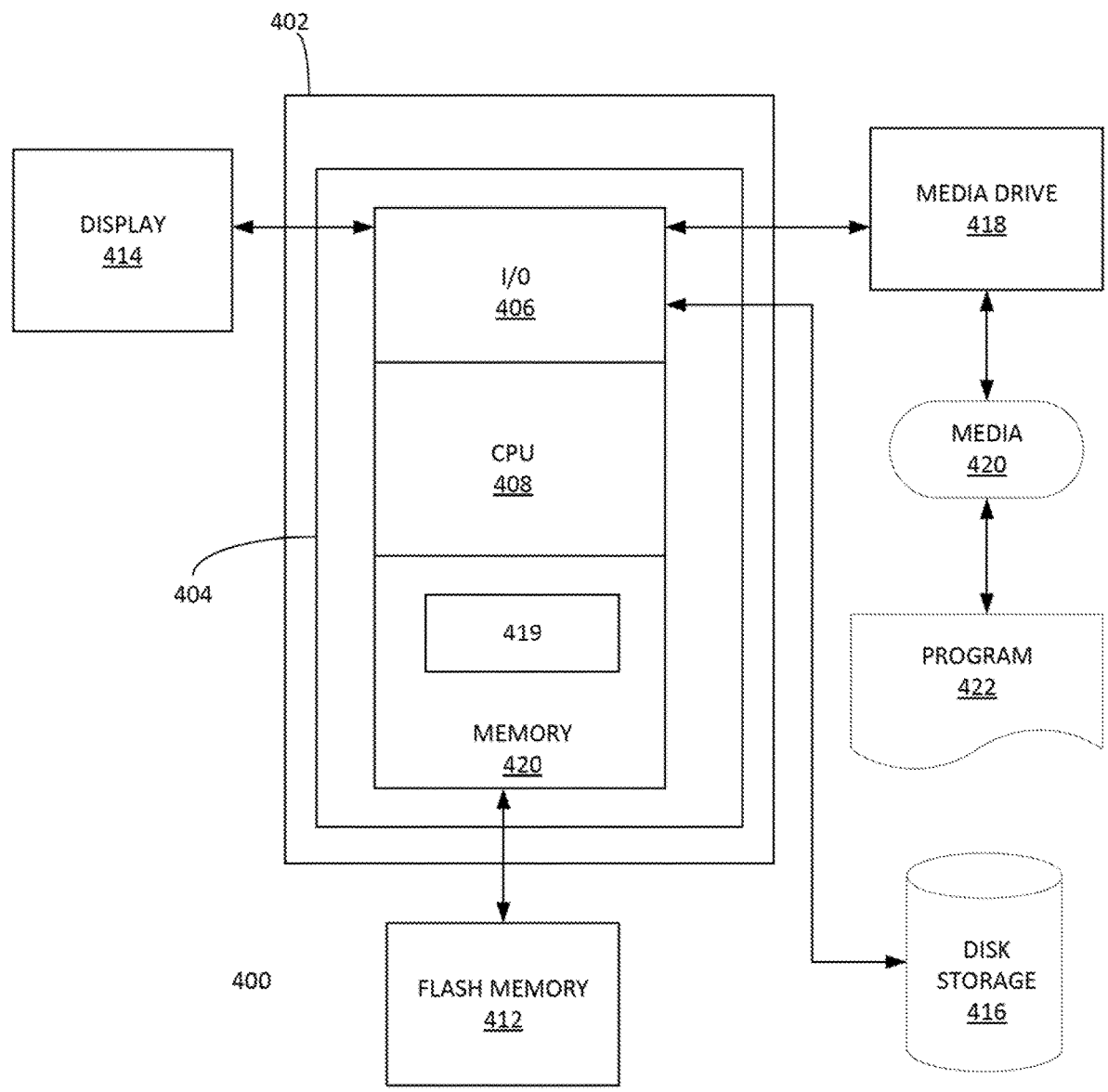
FIG. 4 is a block diagram of a sample-computing environment that can be utilized to implement various embodiments.
Figure 5:
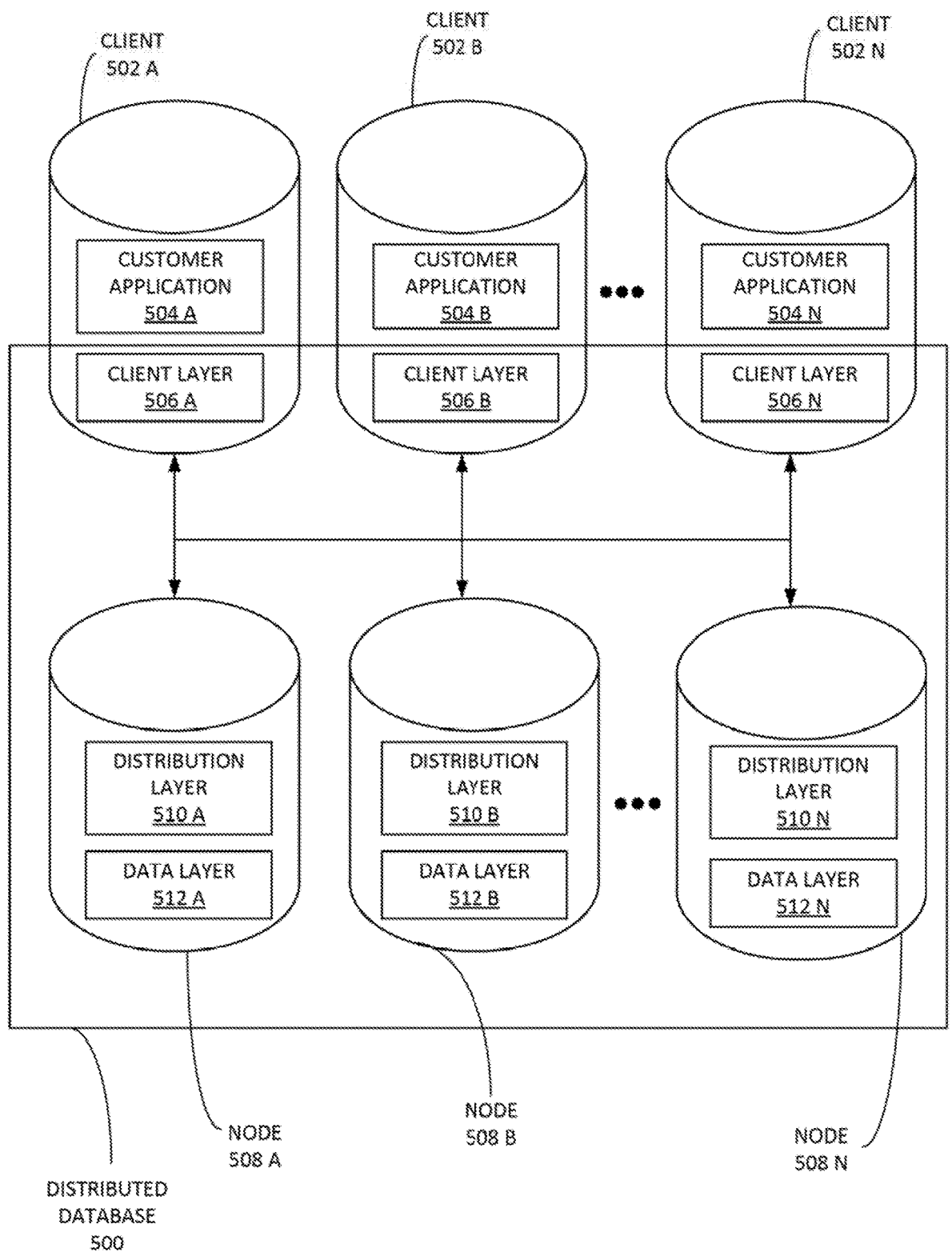
FIG. 5 shows, in a block diagram format, a distributed database system operating in a computer network according to an example embodiment.

FIG. 4 depicts an exemplary computing system 400 that can be configured to perform any one of the processes provided herein. In this context, computing system 400 may include, for example, a processor, memory, storage, and I/O devices (e.g., monitor, keyboard, disk drive, Internet connection, etc.). However, computing system 400 may include circuitry or other specialized hardware for carrying out some or all aspects of the processes. In some operational settings, computing system 400 may be configured as a system that includes one or more units, each of which is configured to carry out some aspects of the processes either in software, hardware, or some combination thereof.

FIG. 4 depicts computing system 400 with a number of components that may be used to perform any of the processes described herein. The main system 402 includes a motherboard 404 having an I/O section 406, one or more central processing units (CPU) 408, and a memory section 410, which may have a flash memory card 412 related to it. The I/O section 406 can be connected to a display 414, a keyboard and/or other user input (not shown), a disk storage unit 416, and a media drive unit 418. The media drive unit 418 can read/write a computer-readable medium 420, which can contain programs 422 and/or data. Computing system 400 can include a web browser. Moreover, it is noted that computing system 400 can be configured to include additional systems in order to fulfill various functionalities. Computing system 400 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure S shows, in a block diagram format, a distributed database system (DDBS) 500 operating in a computer network according to an example embodiment. In some examples, DDBS 500 can be an Aerospike® database. DDBS 500 can typically be a collection of databases that can be stored at different computer network sites (e.g. a server node). Each database may involve different database management systems and different architectures that distribute the execution of transactions. DDBS 500 can be managed in such a way that it appears to the user as a centralized database. It is noted that the entities of distributed database system (DDBS) 500 can be functionally connected with a PCIe interconnections (e.g. PCIe-based switches, PCIe communication standards between various machines, bridges such as non-transparent bridges, etc.). In some examples, some paths between entities can be implemented with Transmission Control Protocol (TCP), remote direct memory access (RDMA) and the like.

DDBS 500 can be a distributed, scalable NoSQL database, according to some embodiments. DDBS 500 can include, inter alia, three main layers: a client layer 506 A-N, a distribution layer 510 A-N and/or a data layer 512 A-N. Client layer 506 A-N can include various DDBS client libraries. Client layer 506 A-N can be implemented as a smart client. For example, client layer 506 A-N can implement a set of DDBS application program interfaces (APIs) that are exposed to a transaction request. Additionally, client layer 506 A-N can also track cluster configuration and manage the transaction requests, making any change in cluster membership completely transparent to customer application 504 A-N.

Distribution layer 510 A-N can be implemented as one or more server cluster nodes 508 A-N. Cluster nodes 508 A-N can communicate to ensure data consistency and replication across the cluster. Distribution layer 510 A-N can use a shared-nothing architecture. The shared-nothing architecture can be linearly scalable. Distribution layer 510 A-N can perform operations to ensure database properties that lead to the consistency and reliability of the DDBS 500. These properties can include Atomicity, Consistency, Isolation, and Durability.

Atomicity. A transaction is treated as a unit of operation. For example, in the case of a crash, the system should complete the remainder of the transaction, or it may undo all the actions pertaining to this transaction. Should a transaction fail, changes that were made to the database by it are undone (e.g. rollback).

Consistency. This property deals with maintaining consistent data in a database system. A transaction can transform the database from one consistent state to another. Consistency falls under the subject of concurrency control.

Isolation. Each transaction should carry out its work independently of any other transaction that may occur at the same time.

Durability. This property ensures that once a transaction commits, its results are permanent in the sense that the results exhibit persistence after a subsequent shutdown or failure of the database or other critical system. For example, the property of durability ensures that after a COMMIT of a transaction, whether it is a system crash or aborts of other transactions, the results that are already committed are not modified or undone.

In addition, distribution layer 510 A-N can ensure that the cluster remains fully operational when individual server nodes are removed from or added to the cluster. On each server node, a data layer 512 A-N can manage stored data on disk. Data layer 512 A-N can maintain indices corresponding to the data in the node. Furthermore, data layer 512 A-N be optimized for operational efficiency, for example, indices can be stored in a very tight format to reduce memory requirements, the system can be configured to use low level access to the physical storage media to further improve performance and the likes.

In some embodiments, cluster nodes 508 A-N can be an Aerospike Smart Cluster™. Cluster nodes 508 A-N can have a shared-nothing architecture (e.g. there is no single point of failure (SPOF)). Every node in the duster can be substantially identical. For example, cluster nodes 508 A-N can start with a few nodes and then be scaled up by adding additional hardware. Cluster nodes 508 A-N can scale linearly. Data can be distributed across cluster nodes 508 A-N can using randomized key hashing (e.g. no hot spots, just balanced load). Nodes can be added and/or removed from cluster nodes 508 A-N can without affecting user response time (e.g. nodes rebalance among themselves automatically).

Auto-discovery. Multiple independent paths can be used for nodes discovery—an explicit heartbeat message and/or via other kinds of traffic sent to each other using the internal cluster inter-connects. The discovery algorithms can avoid mistaken removal of nodes during temporary congestion. Failures along multiple independent paths can be used to ensure high confidence in the event. Sometimes nodes can depart and then join again in a relatively short amount of time (e.g. with router glitches). DDBS 500 can avoid race conditions by enforcing the order of arrival and departure events.

Balanced Distribution. Once consensus is achieved and each node agrees on both the participants and their order within the cluster, a partitions algorithm (e.g. Aerospike Smart Partitions™ algorithm) can be used to calculate the master and replica nodes for any transaction. The partitions algorithm can ensure no hot spots and/or query volume is distributed evenly across all nodes. DDBS 500 can scale without a master and eliminates the need for additional configuration that is required in a sharded environment.

Synchronous Replication. The replication factor can be configurable. For example, a deployment uses a replication factor of two (2). The cluster can be rack-aware and/or replicas are distributed across racks to ensure availability in the case of rack failures. For writes with immediate consistency, writes are propagated to all replicas before committing the data and returning the result to the client. When a cluster is recovering from being partitioned, the system can be configured to automatically resolve conflicts between different copies of data using timestamps. Alternatively, both copies of the data can be returned to the application for resolution at that higher level. In some cases, when the replication factor can't be satisfied, the cluster can be configured to either decrease the replication factor and retain all data, or begin evicting the oldest data that is marked as disposable. If the cluster can't accept any more data, it can begin operating in a read-only mode until new capacity becomes available, at which point it can automatically begin accepting application writes.

Self-Healing and Self-Managing. DDBS 500 and cluster nodes 508 A-N can be self-healing. If a node fails, requests can be set to automatically fall-over. When a node fails or a new node is added, the cluster automatically re-balances and migrates data. The cluster can be resilient in the event of node failure during re-balancing itself. If a cluster node receives a request for a piece of data that it does not have locally, it can satisfy the request by creating an internal proxy for this request, fetching the data from the real owner using the internal cluster interconnect, and subsequently replying to the client directly. Adding capacity can include installing and/or configuring a new server and cluster nodes 508 A-N can automatically discover the new node and re-balances data (e.g. using a Paxos consensus algorithm).

DDBS 500 can have a Shared-Nothing architecture: every node in an Aerospike cluster is identical, all nodes are peers and there is no single point of failure. Data is distributed evenly across nodes in a cluster using a Smart Partitions algorithm.

It is noted that in an operational database, the fastest and most predictable index can be the primary key index. This index can provide the most predictable and fastest access to row information in a database. The primary key index can be a blend of distributed hash table technology with a distributed tree structure in each server. In one example, the entire keyspace in a namespace (e.g. a database) can be partitioned using a robust hash function into partitions. There can be total of 4096 partitions and are equally distributed across nodes in the cluster. At the lowest level, a red-black in-memory structure can be used, similar to the data structures used in a MemCache system. The primary index can be on the twenty (20) byte hash (e.g. also called digest) of the specified primary key. While this expands the key size of some records (which might have, for example, a unique eight (8) byte key), it can be beneficial because the code works predictably regardless of input key size, or input key distribution.

Secondary indexes can be on the non-primary key, which gives the ability to model one to many relationships. Indexes are specified on a bin-by-bin (like columns in an RDBMS) basis. This can allow efficient updates and minimizes the amount of resources required to store the indexes. A data description language (DDL) can be used to determine which bins and type are to be indexed. Indexes can be created and removed dynamically through provided tools or the API.

Additional techniques for AP mode implementation are now provided. DDBS 500 can setup cluster nodes that are tightly coupled so that partitions are virtually impossible to create. This means that a replicated a database cluster of DDBS 500 can provides high consistency and high availability during node failures and restarts so long as the database cluster does not split into separate partitions. The following techniques can be utilized to minimize network based partitioning.

Fast and robust heartbeats can be implemented. The heartbeats can be sent at a regular/periodic pace. In one embodiment, the cluster nodes can be expected to be close to each other thus requiring less than millisecond latency for node-to-node heartbeat messages. Heartbeats can be sent on UDP (e.g. in multicast mode) or on TCP (e.g. mesh mode). On top of this, DDBS 500 can implement a secondary heartbeat mechanism where the data transfer can augment the primary heartbeats. So, even if the primary heartbeat fails, if there are continuous read/write operations in the database, the cluster will be held together.

Consistent Paxos-based cluster formation can be implemented. DDBS 500 can use a fast Paxos-based algorithm to coalesce the database cluster. A short heartbeat interval can be implemented since it enables the Paxos based algorithm to discover node arrivals and node departures quickly and then re-coalesce the new database cluster within tens of milliseconds. In practice, a short-term unavailability during database cluster formation can preserve consistency.

DDBS 500 can provide high performance results in smaller database clusters. By using high capacity SSDs, each node of the database cluster can hold and serve data while maintain the size of the cluster relatively small. In one optional embodiment, database cluster nodes can be connected using the same switch with an adequate fail-safe backup. In addition to avoiding network partitioning, DDBS 500 can use additional techniques that ensure consistency during node failures and rolling upgrades.

Single node failures can be handled by DDBS 500 as follows. When using replication factor>=2, if a single node fails then the remaining nodes can have all the data of the cluster. DDBS 500 can implement automatic rebalancing (e.g. via migration) of the data between the surviving nodes. While the migration is being implemented, DDBS 500 can allow writes to continue. To make sure that no writes are lost in a race condition between the act of re-balancing and accepting writes, DDBS 500 can maintain a journal of changes that will be reapplied, after proper checks, at the end of a partition's migration.

Rolling upgrades can be implemented in DDBS 500. It is noted that software can be upgraded in more number of cases (thereby necessitating a node down) than the case of unplanned failure of the nodes. This is a non-issue with DDBS 500 because of how DDBS 500 handles single node failure cases very gracefully without any data loss, as explained above.

DOBS 500 can implement transaction repeatable read settings. When multiple nodes have merged into a database cluster (e.g. in a short amount of time), there may be many copies of the record created in the cluster. However, only one version of the record is the correct one. To overcome such a scenario, DDBS 500 can provide a configuration option to enable repeatable read. For every read operation, when repeatable read is enabled, DDBS 500 can consult all nodes in the cluster that claim to have data belonging to the partition, pick the most recent record (e.g. a correct record), and return it to the client. The system can continue to use this merge algorithm during read operations until all the copies of a partition are merged as part of the migration process. Accordingly, there cannot be a situation where different read requests will return different versions of the data (e.g. repeatable read requires this).

In the event the replica node communicates back an error, the write can be retried as the prole can fail only due to temporary reasons such as, inter alia: timeout or running out of disk space (which is continuously garbage collected). In one example, in which a prole did not communicate back anything to the master and the network connection is lost. The master may not know if the record was successfully written or not. In this case, the client can receive an "unknown" transaction state back.

One example of implementing DDBS 500 in CP mode is now provided. In CP mode, when a database cluster splits into two or more active clusters, availability may be sacrificed. For example, the minority quorum(s) can be made to halt. This action can prevent a client from receiving inconsistent data, but can also reduce availability. DDBS 500 smart clients can also be made to detect cluster-partitioning occurrences and act appropriately to restrict access to exactly one of the partitions. In this scenario, per the CAP theorem, DDBS 500 can prioritize consistency over availability, in order to allow for partition-tolerance. There can be use cases where availability can be sacrificed and a CP system is needed. To enable DDBS 500 to be used in more domains, a configuration for operating the cluster in CP mode can be implemented in addition to the AP. The actual mode of an individual cluster can be configurable by the operator based on their needs.

As part of a CP mode, DDBS 500 can support a static cluster size. The static cluster concept works as follows. The idea of a static cluster can refer to predefining the nodes of a database cluster. A system administrator ca be allowed to specify the exact set of cluster nodes and engage a "static-cluster" switch so that the composition of the cluster is fixed to include exactly all of the current nodes of the cluster. While the static-cluster switch is engaged, any cluster state change may not automatically result in changes to the partition map. The partition map determines how master and replicas of partitions are stored in nodes. For example, the partition map can be fixed and no migration of data is allowed whenever the static cluster switch is engaged. The operator can disengage the static-cluster switch before the cluster configuration can be changed in a controlled manner to add or remove nodes. The operator can then wait for all migrations to be completed before reengaging the static-cluster switch. If the cluster is split into one or more islands, and if the client sends a request to one of the nodes in an island, the following steps can be taken. If the request is a read request, and one of the nodes in the island has a copy of the data, the read request can be serviced. If the request is a write request, and the node is the master (and/or the master is in the island), it can perform the write only if all the replicas are in the same island. It is noted that when there is network based cluster partitioning, it is normally one or a very few nodes that become separated. In one scenario, where only one node gets separated from its cluster, only 1/nth of the data is unavailable for writes (e.g. where n is the number of nodes in the cluster). This may be quite acceptable in order to obtain full consistency in the presence of partitions. Larger sized islands may form if the nodes are connected through a hierarchy of switches and the intermediate (non-leaf) switch fails. Accordingly, the nodes DDBS 500 can be connected to the same switch, if possible. However, it is not mandatory.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method for managing consistency and availability tradeoffs in a real-time operational database management system (DBMS) comprising:
    implementing consistency in an AP mode of real-time operational DBMS by;
        adding a set of schemes that enable a real-time operational DBMS to linearize read/write operations in all situations except a first specified situation and a second specified situation, wherein when the real-time operational DBMS is in AP mode, at least one master node for every data item is available in the database cluster of the real-time operational DBMS at all times; and
    implementing a CP mode of operation,
        wherein the first specified comprises detecting that a split-brain partition occurs in a database cluster of the real-time operational DBMS,
        wherein the second specified situation comprises detecting that a number of nodes are simultaneously lost due to failures, and
        wherein the at least one master node for every data item is available in the database cluster of the real-time operational DBMS during a network partition operation.

2. The computerized method of claim 1, wherein the number of nodes that are simultaneously lost due to failures is determined greater than the replication count.

3. The computerized method of claim 2, wherein in CP mode of operation, the real-time operational DBMS implements an atomic transfer of a master node.

4. The computerized method of claim 3 further comprising:
    when in CP mode of operation, implementing a master node restriction that ensures that no more than one master node is ever available.

5. The computerized method of claim 3 further comprising:
    when in CP mode of operation, maintaining a set of information about the set of nodes in the database cluster such that a subset of nodes determine whether the one available master node can be a master of specified subsets of the data.

6. The computerized method of claim 4 further comprising:
    when in CP mode of operation, implementing a replication integrity operation.

7. The computerized method of claim 5, wherein the replication integrity operation guarantees a strict consistency using a redo mechanism to ensure that no read operations and write operation are allowed when replicas are in an unknown state.

8. A computerized system useful for managing consistency and availability tradeoffs in a real-time operational database management system (DBMS) comprising:
    at least one processor configured to execute instructions;
    at least one memory containing instructions when executed on the at least one processor, causes the at least one processor to perform operations that:
        implement consistency in an AP mode of the real-time operational DBMS by;
            add a set of schemes that enable a real-time operational DBMS to linearize read/write operations in all situations except a first specified situation and a second specified situation, wherein when the real-time operational DBMS is in AP mode, at least one master node for every data item is available in the database cluster of the real-time operational DBMS at all times; and implement a CP mode of operation, wherein the first specified comprises detecting that a split-brain partition occurs in a database cluster of the real-time operational DBMS, wherein the second specified situation comprises detecting that a number of nodes are simultaneously lost due to failures, and wherein the at least one master node for every data item is available in the database cluster of the real-time operational DBMS during a network partition operation.

9. The computerized system of claim 8, wherein the number of nodes that are simultaneously lost due to failures is determined greater than the replication count.

10. The computerized system of claim 9, wherein in CP mode of operation, the real-time operational DBMS implements an atomic transfer of a master node.

11. The computerized system of claim 10, wherein the least one memory containing instructions when executed on the at least one processor, causes the at least one processor to perform operations that:

when in CP mode of operation, implements a master node restriction that ensures that no more than one master node is ever available.

12. The computerized system of claim 10, wherein the least one memory containing instructions when executed on the at least one processor, causes the at least one processor to perform operations that:

when in CP mode of operation, maintains a set of information about the set of nodes in the database duster such that a subset of nodes determine whether the one available master node can be a master of specified subsets of the data.

13. The computerized method of claim 11, wherein the least one memory containing instructions when executed on the at least one processor, causes the at least one processor to perform operations that:

when in CP mode of operation, implements a replication integrity operation.

14. The computerized method of claim 12, wherein the replication integrity operation guarantees a strict consistency using a redo mechanism to ensure that no read operations and write operation are allowed when replicas are in an unknown state.

* * * * *